UNITED STATES PATENT OFFICE.

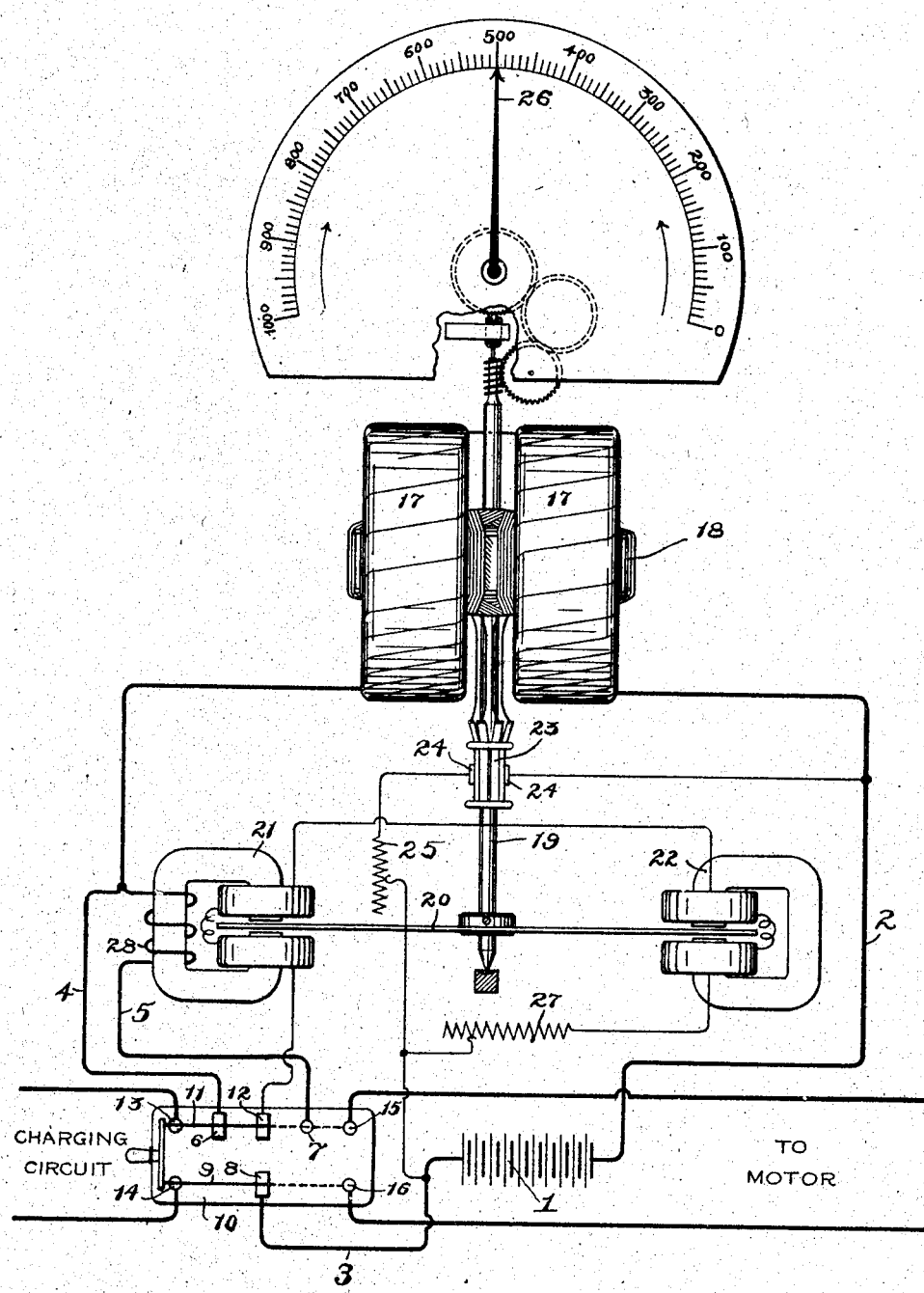

THOMAS DUNCAN, OF CHICAGO, ILLINOIS.

ELECTRICAL MEASURING INSTRUMENT.

No. 796,050.　　　　　Specification of Letters Patent.　　　　　Patented Aug. 1, 1905.

Application filed August 26, 1901. Serial No. 73,325.

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, of which the following is a full, clear, concise, and exact description, reference being had to the accompanying drawing, forming a part of this specification.

My invention relates to meters adapted for use in connection with storage batteries, and has for its object the provision of a meter that is adapted to rotate at different rates of speed per unit of load or energy upon variations in the rate of battery discharge.

By means of my invention the meter is caused to operate at an increased rate of speed per unit of load or energy upon an increase in the rate of discharge.

In the use of storage batteries it is well known that the output of the battery will always be less than the energy stored therein and that the battery loss will increase upon a sufficient increase in the rate of battery discharge. For example, if the battery is charged one thousand ampere-hours at its normal rate of charge—say one hundred amperes per hour for ten hours—the total discharge at the same rate which can be made available without harm to the battery will not be more than about eighty per cent. of the energy charged into the battery with some makes of battery, this battery loss varying with different makes—that is, the battery will effectively operate at one hundred amperes per hour for eight hours, giving out eight hundred ampere-hours after having received one thousand. If the rate of discharge is increased, the total output will be diminished. For example, with certain makes of battery the energy discharged will not be over about seventy per cent. if the rate is increased to one hundred and forty amperes, sixty per cent. if the rate of discharge is doubled, and forty per cent. if the rate of discharge is quadrupled.

I have provided an instrument that is adapted to compensate for the varying battery losses due to the variation of rates of discharge, so that the user of the battery may know when the available energy in the battery is spent. Ordinarily a meter associated with a storage battery that is discharged at varying rates will indicate the presence of more energy in the battery than actually exists. The meter of my invention is also adapted to measure the energy that is being stored in the battery, the meter when thus associated with the charging source of current being operatively dissociated from the means that cause the meter to operate at varying rates of speed per unit of load or energy at different rates of discharge.

The meter of my invention is particularly adapted for use in connection with meters employed in operating motor-vehicles where the rate of discharge is not constant, but is liable to be changed at any time. The preferred means for causing this variation in the rate of operation of the meter consists in the provision of a variable load that is automatically controlled by means subject to the variable volume of current flowing from the battery. This load is preferably in the form of an electromagnetic drag acting upon a disk coupled with the rotating element of the meter and having a winding subject to the pressure of the battery. This electromagnet is also provided with a winding in series with the battery, which acts in opposition to the shunt-winding in a degree dependent upon the flow of current or rate of discharge to decrease the force of the drag and permit the speed of the disk and rotating element of the meter to increase as the rate of discharge increases.

I will explain my invention more fully by reference to the accompanying drawing, which is a diagrammatic view of a storage-battery system with the meter of my invention associated therewith.

In the drawing a storage battery 1 is illustrated having mains 2 and 3. The main 2 is provided with bifurcated branches 4 5, terminating in contacts 6 and 7, while the main 3 terminates in a pivotal mounting 8, upon which a switch-blade 9 of a switch 10 is secured. A second switch-blade 11 of the switch 10 is also placed upon a pivotal mounting 12. Terminals of a charging-circuit 13 and 14 are illustrated. Terminals 15 and 16 of conductors leading to translating means, as the motor of a motor-vehicle, are also illustrated. When the switch 10 is thrown to the left, the charging-machine or source of current is thrown into circuit with the storage battery. When the switch is thrown to the right, the storage battery is thrown into circuit with the translating means.

I have illustrated a meter having a current-winding included in the main 2, this current-winding being subdivided into coils 17 17. The meter is also provided with a pressure-winding 18, included in bridge between the battery leads or mains. These windings of the meter are constantly in circuit with the battery irrespective of its association with the charging-machine or translating means. The meter-winding 18 is preferably in the form of an armature and is mounted upon a spindle 19, at the lower end of which is provided a disk 20, arranged within the fields of damping-magnets 21 22. The shaft 19 also carries the commutator 23, against which bear brushes 24 24, that serve to include the armature of the meter in circuit, a choking and adjusting resistance 25 being also included in circuit with the armature.

The meter is provided with gearing at its upper end to actuate the measuring-index 26, which by coöperation with a suitable reading-scale serves to indicate the amount of energy stored in the battery in charging and remaining in the battery in discharging.

The meter illustrated is adapted to measure in units of ampere-hours; but I do not wish to be limited to a meter of this character.

The fine windings of the electromagnets 21 and 22 are preferably included in series with each other and with a choking and adjusting resistance 27. The windings of the magnets 21 and 22 are in bridge of the battery leads or mains to be subject to the battery-potential. The core of the magnet 21 is provided with a winding 28, that is connected in circuit with the branch conductor 5. When the switch is thrown to the left in charging the battery, the winding 28 is cut out of circuit, the meter-circuit being completed by way of the branch conductor 4. When the switch is thrown to the right, the branch conductor 4 is disconnected, whereupon the meter-circuit is completed by way of the conductor 5 and the supplemental magnet-winding 28. The force of the electromagnetic drag due to the magnets 21 and 22 depends upon the difference in potential between the battery-terminals, and as that difference becomes less and less as the discharge proceeds the consequent drag will also decrease. The winding 28 exerts an opposing or neutralizing effect upon the main shunt-winding of the magnet 21, effecting a corresponding reduction in the drag. As the magnetization due to this winding 28 varies with the amount of current flowing from the battery, the degree that the braking action is reduced will depend upon the rate of battery discharge. A large flow of current, due to a high rate of discharge, will obviously decrease the drag to a proportionately greater extent than a smaller flow of current due to a lesser rate of discharge, and by proper proportioning and calibration the meter may in this manner be made to compensate for the varying inefficiency of the battery throughout its entire range of operation.

I have thus provided a meter having a damping-disk arranged within the field of a damping-magnet, the damping effect of which magnet is lessened by the counter magnetizing effect due to a winding in series with the storage battery.

While I have herein shown and particularly described the preferred embodiment of my invention, it is obvious that changes may readily be made without departing from the spirit thereof, and I do not wish, therefore, to be limited to the precise disclosure herein set forth; but,

Having thus described my invention, I claim as new and desire to secure by Letters Patent—

1. The combination with a storage battery, of a meter for measuring energy discharged, and means for operating the meter at varying rates of speed per unit of load or energy, according to varying rates of discharge, substantially as described.

2. The combination with a storage battery, of a meter for measuring energy discharged, and means for operating the meter at increased rates of speed per unit of load or energy upon corresponding increases in the rate of discharge of the battery, substantially as described.

3. The combination with a storage battery, of a meter for measuring energy discharged, a load for the meter, and means for decreasing the load upon an increase in the rate of discharge to increase the rate of operation of the meter per unit of load or energy, substantially as described.

4. The combination with a storage battery, of a meter for measuring battery discharge provided with a damping-disk, a magnet within whose field the said disk is located, and means for decreasing the force of the field upon an increase in the rate of battery discharge to increase the rate of operation of the meter per unit of load or energy, substantially as described.

5. The combination with a storage battery, of a meter for measuring battery discharge provided with a damping-disk, a magnet within whose field the said disk is located, and having a winding in circuit with the battery for producing a counter magnetizing effect to reduce the force of the magnet thereby to decrease the load upon the meter and increase the rate of operation of the meter per unit of load or energy, substantially as described.

6. The combination with a storage battery, of a meter for measuring battery discharge provided with a damping-disk, a magnet within whose field the said disk is located, a winding for the magnet subject to the battery-potential, and a second winding for the magnet opposing the pressure-winding and included in series with a battery, whereby the opposing effect is increased upon an increase in the rate of battery discharge to lessen the load upon the meter to cause the meter to operate at an increased rate of speed per unit of load or energy, substantially as described.

7. In a system of distribution, the combination with a storage battery, a charging-circuit and a discharging-circuit, of an electric meter provided with means whereby the meter will register at one rate when connected in the charging-circuit and at a different and variable rate when connected in the discharging-circuit, said second or variable rate varying according to the rate of discharge, substantially as described.

8. An electric meter provided with an electromagnetic drag energized by a winding connected in series with the field-coils of the meter and a winding in shunt thereto, substantially as described.

9. The combination with a storage battery, of an electric meter provided with an electromagnetic drag energized by a winding in series with the battery, substantially as described.

10. The combination with a storage battery, of an electric meter provided with an electromagnetic drag energized by a winding in series with the battery, and an opposing winding in shunt around the battery, substantially as described.

11. In a system of distribution, the combination with a storage battery, a charging-circuit and a discharging-circuit, of an electric meter provided with an electromagnetic drag energized by a winding in series with the battery and by a winding in shunt around the battery, substantially as described.

12. The combination with a storage battery, of an electric meter provided with field-coils connected in series with the battery, armature-coils connected in shunt around the battery, and an electromagnetic drag energized by a winding in series with the battery and a winding in shunt around the battery, substantially as described.

13. The combination with a storage battery, of an electric meter provided with an electromagnetic drag causing the said meter to operate to measure in units of ampere-hours, the said electromagnetic drag being energized by a winding in series with a battery, and an opposing winding in shunt around the battery, substantially as described.

14. The combination with a storage battery, of an ampere-hour meter for measuring energy discharged, and means for operating the meter at varying rates of speed per unit of load or energy according to varying rates of discharge, substantially as described.

15. The combination with a storage battery, of a meter for measuring energy discharged, and means for operating the meter at increased rates of speed per unit of load or energy upon corresponding increases in the rate of discharge of the battery, substantially as described.

16. The combination with a storage battery, of a meter for measuring energy discharged, a load for the meter, and means for decreasing the load upon an increase of the rate of discharge to increase the rate of operation of the meter per unit of load or energy, substantially as described.

In witness whereof I hereunto subscribe my name this 16th day of August, A. D. 1901.

THOMAS DUNCAN.

Witnesses:
    GEORGE L. CRAGG,
    HERBERT F. OBERGFELL.